Figure 1:
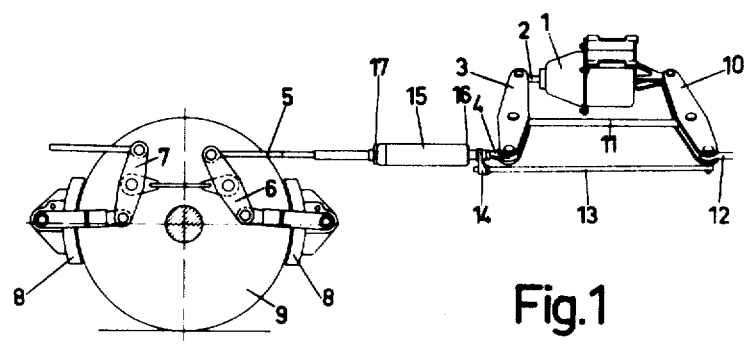

United States Patent

[11] 3,593,826

| [72] | Inventor | Nils Borje Lennart Sander<br>Malmo, Sweden |
|---|---|---|
| [21] | Appl. No. | 854,572 |
| [22] | Filed | Sept. 2, 1969 |
| [45] | Patented | July 20, 1971 |
| [73] | Assignee | Svenska Aktiebolaget Bromsregulator<br>Malmo, Sweden |
| [32] | Priority | Sept. 14, 1968 |
| [33] | | Great Britain |
| [31] | | 43835/68 |

[54] AUTOMATIC AXIALLY ACTING TWO-WAY SLACK ADJUSTER FOR A RAILWAY VEHICLE BRAKE RIGGING
4 Claims, 5 Drawing Figs.

| [52] | U.S. Cl. | 188/196 D,<br>188/202 |
|---|---|---|
| [51] | Int. Cl. | F16d 65/66 |
| [50] | Field of Search | 188/196 D,<br>198—203 |

[56] References Cited
UNITED STATES PATENTS

| 2,767,811 | 10/1956 | Browall et al. | 188/196 (PRR) |
|---|---|---|---|
| 2,837,179 | 6/1958 | Jeppsson | 188/196 (PRR) |
| 2,824,628 | 2/1958 | Browall | 188/196 (PRR) |
| 3,285,375 | 11/1966 | Jeppsson et al. | 188/196 (PRR) |

*Primary Examiner*—Duane A. Reger
*Attorney*—Laurence R. Brown

ABSTRACT: There is disclosed an automatic axially acting two way slack adjuster which has two telescopically displaceable rod parts one of which is a threaded spindle with a nonself-locking pitch. A barrel about the rod parts encloses a spring engaging a nut on the other rod part which engages the threaded spindle. To produce a shortened length, a second nut is provided with a toothed surface engaging a corresponding toothed surface on the barrel and is spring biased by the barrel spring.

AUTOMATIC AXIALLY ACTING TWO-WAY SLACK ADJUSTER FOR A RAILWAY VEHICLE BRAKE RIGGING

This invention relates to an automatic axially acting two-way slack adjuster for a railway vehicle brake rigging, one kind of such adjuster comprises two telescopically displaceable rod parts, one of which is a spindle provided with screw threads having such pitch as to be nonself-locking and carrying a nut surrounded by the other rod part and having a limited axial play relative thereto. The adjuster comprises a barrel surrounding the overlapping end portions of the said two rod parts and containing a barrel spring the force of which is normally transmitted through said nut. It includes a telescopically compressible push rod device extending through the front end of the adjuster and being adapted to contact said nut when the adjuster is axially displaced towards an exterior reference stop member.

An adjuster of the kind referred to has the advantage that an automatic adjustment of its total length can be obtained immediately during the first braking cycle whenever an adjustment has become necessary. The adjuster is very simple as it only contains one nut. However, the total length of the adjuster should be made so long that the barrel spring has sufficient force through an axial distance corresponding to the maximum variations of the length of the adjuster. This is a drawback as many brake riggings do not allow the use of such long adjusters.

The present invention is to provide an improved slack adjuster of the kind referred to which can be made of shorter length and still has the advantage of a reliable immediate-acting slack adjuster.

According to the present invention an improved slack adjuster of the kind referred to has the spindle provided with a second nut having a toothed surface for engaging a correspondingly toothed surface on the said barrel, the said second nut being an element in the transmission of the spring force of the said barrel spring.

Figure 2:
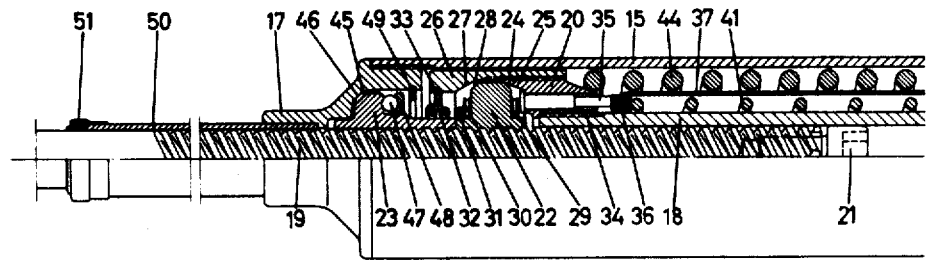
Figure 3:
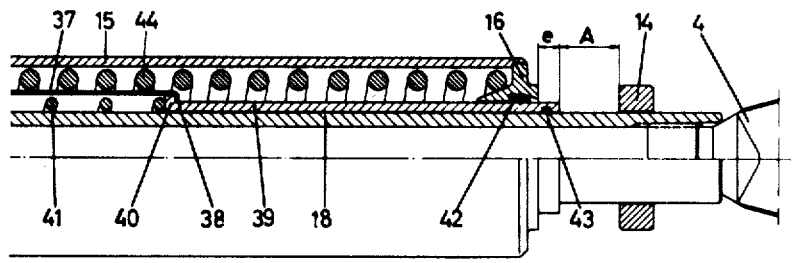
Figure 4:
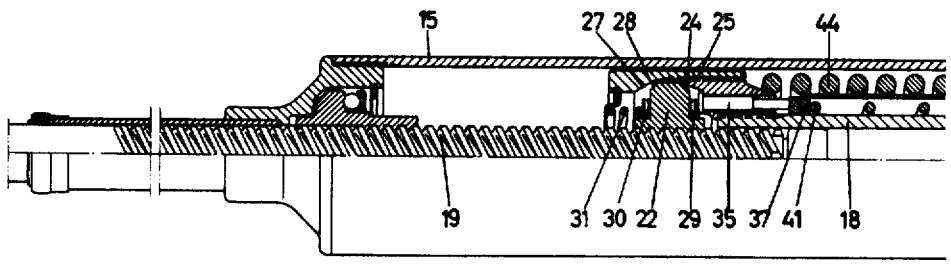
Figure 5:
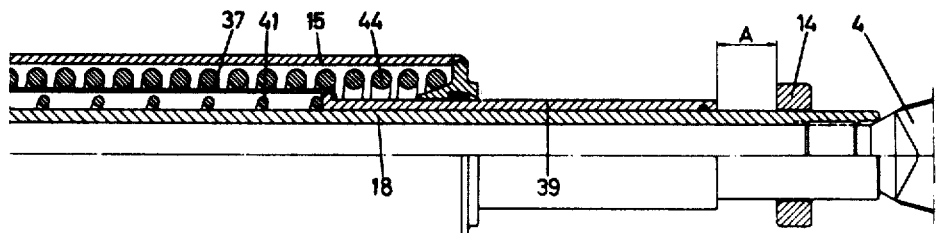

The invention and how it may be performed are further described below by way of example, and in the accompanying drawings:

FIG. 1 is a diagrammatic illustration of one example of a brake rigging in which a slack adjuster according to the invention may be used, FIG. 2 shows on a larger scale the rear portion of one form of a slack adjuster according to the invention, in external view in the lower half of the Figure, and in axial section in the upper half of the Figure, FIG. 3 shows the remaining front portion of the adjuster, FIG. 4 is a view similar to FIG. 2 showing the rear portion of the adjuster, the elements being in different relative positions, and FIG. 5 is a view of the remaining front portion of the adjuster shown in FIG. 4.

Referring first to FIG. 1, a brake cylinder 1 is provided with a piston rod 2 which is pivotally connected to one end of a live brake lever 3, the other end of which is connected to a crosshead 4 forming part of a slack adjuster. The left-hand or rear end of the slack adjuster is part of a rod 5, the extreme left-hand end of which is connected to a lever system comprising a live brake lever 6 and a dead brake lever 7 for applying blocks or shoes 8 against a wheel 9. A dead brake lever 10 is pivotally connected to a bracket on the brake cylinder 1 and is connected to the brake lever by a rod 11. The end of the dead brake lever 10 remote from the cylinder 1 is pivotally connected to a rod 12 which is adapted to be connected to a lever system (not shown) for applying the brakes of another wheel (not shown). However, in order to simplify the explanation, it will be assumed that the rod 12 is always kept stationary seeing that it is well known in the art that this makes no difference as regards the function of the brake rigging or the slack adjuster. A rod 13 carrying an exterior reference stop 14 is also pivotally connected to the said remote end of the dead brake lever 10. Thus, for the purpose of the following explanation, the reference stop 14 may be assumed to be stationary.

The brake rigging just described and shown in FIG. 1 is of conventional type. The slack adjuster according to the invention may, of course, be used in any other suitable conventional type of brake rigging where the required space is available.

Referring now particularly to FIGS. 2 and 3, the slack adjuster there illustrated comprises an elongated housing consisting of a cylindrical shell or barrel 15 closed at its front end by means of a front cover or plug 16, and at its rear end by means of a rear cover or plug 17. A front rod part in the form of a tube 18 extends into the housing barrel 15 from the front end thereof, and a rear rod part 19 in the form of a screw-threaded spindle extends into the housing barrel 15 from the rear end thereof. The front rod part tube 18 is rigidly connected to the cross head 4, FIG. 1, and carries at its rear end a collar member 20. The said collar member 20 is screw threaded on the tube 18.

The rear rod part 19 constitutes the front end of the rod 5 illustrated in FIG. 1 and is constructed in the form of a screw-threaded spindle having a steep screw thread, i.e. a screw thread the pitch of which is such that a nut engaged with the screw thread may rotate when exposed to an axial force (nonself-locking screw thread).

The front end portion of the rear rod part 19 extends telescopically into the front rod part tube 18 and is guided therein by the cylindrical surface of the head of a screw 21 secured to the front end of the rear rod part 19. The rear rod part 19 carries two nuts, viz. a front nut 22 hereinafter referred to as the locking nut, and a rear nut 23 hereinafter referred to as the feeding nut.

The front end of the locking nut 22 is provided with a tapered or frustoconical locking surface 24 adapted to frictionally engage a tapered locking surface 25 at the rear end of the collar 20. A traction sleeve 26 is screw threaded on the collar 20 and is provided with a forwardly directed tapered or frustoconical locking surface 27 adapted to engage a rear surface 28 on the locking nut 22 so as to establish a friction clutch. The locking nut 22 carries roller bearings 29 and 30 at its front end and at its rear end respectively.

A helical compression spring 31 (FIG. 2) is clamped between the rear roller bearing 30 and a spring support 32 which in turn bears against a split ring 33 mounted in the traction sleeve 26. The collar 20 is provided with three axially extending bores 34 (only one of which is shown) angularly spaced apart. Each of the bores 34 contains a cylindrical push rod 35 slidably mounted therein. The rear end of the push rod 35 is adapted to contact the front end of the front roller bearing 29 and the front end of the push rod 35 is adapted to contact a ring 36 surrounding the tubular front rod part 18. The said ring 36 is rigidly secured to the rear end of a sleeve 37 the front end of which is provided with an inwardly directed flange 38 (FIG. 3). The front end of the sleeve 37 (FIG. 3) surrounds a tube 39 having an outwardly directed flange 40, the flanges 38 and 40 limiting an axial relative movement between the sleeve 37 and the tube 39. A helical compression spring 41 surrounds the rod part 18 and is clamped between the ring 36 and the flange 40 and thus tends to keep the sleeve 37 and the tube 39 in the axial relative position providing the maximum total length.

The tube 39 (FIG. 3) is passed through the front cover 16, a gasket 42 being provided for preventing entrance of dirt and water into the interior of the slack adjuster. Another gasket 43 is provided for similar reasons between the front end of the rod 39 and the front rod part 18. The reference stop 14 previously described in connection with FIG. 1 is also shown in FIG. 3. The axial distance between the rear end surface of the reference stop 14 and the front end surface of the tube 39 is shown as A in FIG. 3 while the axial distance between the front ends of the tube 39 and the cover 16 is shown as $e$.

A helical compression spring 44 is clamped between a tapered or frustoconical rear surface of the cover 16 (FIG. 3)

and a tapered or frustoconical front surface of the collar member 20 (FIG. 2).

The rear cover 17 (FIG. 2) is provided with an interior forwardly directed toothed surface 45 adapted to be clutchably connected to a toothed rear surface 46 on the feeding nut 23. The feeding nut carries a ball bearing 47 the front race 48 of which is adapted to contact a locking ring 49 mounted on the rear cover 17 at an axial distance exceeding the axial overlapping of the teeth 45 and 46. In the position shown in FIG. 2 the front end of the nut 23 engages the rear end of the nut 22.

The cover 17 is provided with a rearwardly extending tube 50, a gasket 51 being mounted at the extreme rear end thereof for preventing the entrance of dirt and water into the interior of the slack adjuster.

The force of the small spring 31 (being about 5 kp. or 9 pounds) is transmitted from the front end of the spring 31 to the ball bearing 30, to the nut 22, via the surfaces 24 and 25 to the collar member 20, to the traction sleeve 26, to the locking ring 33 and the spring support 32 to the rear end of the spring 31.

The force of the spring 41 (being about 75 kp. or 135 pounds) is transmitted from the front end thereof to the flange 40, the flange 38, the sleeve 37 and the ring 36 to the rear end of the sleeve 37. Thus an axial compression force smaller than 75 kp. or 135 pounds may be transmitted from the push rods 35 to the rod 39 without influence upon their axial relative positions. A transmitted force greater than 75 kp. or 135 pounds will only be possible after a corresponding compression of the spring 41.

The force of the spring 44 (being of about 250 kp. or 450 pounds) is transmitted from the front end of the spring to the front cover 16, the barrel 15, the rear cover 17, the feeding nut 23, the locking nut 22, the surfaces 24 and 25 and via the collar 20 to the rear end of the spring 44.

The slack adjuster shown in FIGS. 2 and 3 will operate as follows:

The slack adjuster is adapted to transmit brake forces as tension forces and a tension force is transmitted from the front rod part 18 to the rear rod part 19 via the following elements: the rear end of the rod part 18, the collar 20, the spring 44, the front cover 16, the barrel 15, the rear cover 17 and the feeding nut 23 to the threads of the rear rod part 19. Such transmission is only possible as long as the force is smaller than the force of the spring 44 (about 250 kp. or 450 pounds). In case of transmission of greater forces the spring 44 will be compressed and the clutch formed by the surfaces 24, 25 will become disengaged while a clutch engagement will be formed between the surfaces 27 and 28. The part of the transmitted force exceeding the force of the spring 44 will now be transmitted direct from the collar 20 via the traction sleeve 26 and the locking nut 22 to the threads of the rear rod part 19.

In case the adjuster shown in FIG. 2 and 3 is mounted in a brake rigging having insufficient slack—e.g. because new brake blocks have replaced worn out blocks the following will happen during the first braking cycle.

The rod parts 18 and 19 together with the barrel 15 and all elements contained therein will move as a unit towards the right—i.e. in the forward direction and the axial distance A between the rear end of the stop 14 and the front end of the tube 39 will decrease. Owing to insufficient slack in the rigging the brake force transmitted will reach the value of the force of the spring 44 prior to the contact between the reference stop 14 and the tube 39. At this moment the clutch formed by the surfaces 24 and 25 will become disengaged. The nut 22 is now free to rotate on the rod part 19 in the forward direction influenced by the force of the spring 31. The rod part 19 will now remain stationary while the tubular rod part 18 is moved axially in the forward direction. The barrel 15 will remain stationary, but the barrel spring 44 will be compressed according to the raise in transmitted brake force. The front rod part 18 will move in the forward direction together with the collar 20, the traction sleeve 26, the nut 22, the push rods 35, the sleeve 37 and the rod 39. As soon as the rod 39 contacts the stop 14 the forward movement of the nut 22 will cease and clutch contact will be formed between the surfaces 27 and 28. The slack in the brake rigging has now been increased by a value corresponding to the increase in axial distance between the nuts 22 and 23 on the rear rod part 19.

After replacement of new brake blocks the parts of the slack adjuster may thus have the relative positions shown in FIGS. 4 and 5.

During wear of the new blocks the slack in the rigging will increase and in order to provide compensation the automatic slack adjuster will now reduce its total length correspondingly as follows:

During the first brake cycle with excessive slack in the rigging the stop 14 will contact the tube 39 prior to the transmission of a brake force corresponding to the force of the barrel spring 44. Thus all parts of the slack adjuster except the tube 39 will continue their forward movement while the spring 41 is compressed. The clutch 24, 25 will open as soon as the transmitted brake force corresponds to the difference in the forces of the spring 44 and 41. The force of the spring 41 is working against the brake force as a resistance caused by the stop 14. An increase in brake force beyond the said difference in spring forces will cause the clutch surfaces 24, 25 to become disengaged and the surfaces to 27, 28 to engage.

During the following release of the brake the slack adjuster will move rearwardly relative the stop 14 except for the tube 39, which will remain stationary in contact with the exterior reference stop 14. As soon as the transmitted brake force reaches the value equal to the difference in the forces of the springs 44 and 41 (the force of the spring 31 being negligible) the clutch surfaces 27 and 28 will disengage. However, as the force of the spring 31 is very small compared with the force of the spring 41 the nut 22 will be caused to rotate rearwardly on the threads of the rod 19. During the rotation of the nut 22 the spring 44 will expand and the rotation will continue until the stop 14 ceases to contact the tube 39, i.e. until the spring 41 has achieved its maximum length defined by the sleeve 37. The slack adjuster has now decreased its total length by an axial distance corresponding to the compression of the spring 41 during the application of the brake.

Referring once more to the position shown in FIGS. 1 and 2, an automatic adjustment in case of excessive slack will now be described.

During application of the brake the braking force is initially smaller than the force of the spring 44. The stop member 14 will contact the front end of the tube 39 which will then remain stationary. The spring 41 will be compressed as its force is insufficient to overcome the axial force acting forwardly on the nut 22. After a further travel in the forward direction through the distance e the cover 16 will contact the stop 14 and the barrel 15 will become stationary. Due to a further travel in the forward direction of the rod part 19 the clutch between the teeth 45 and 46 will open and the nut 23 will start to rotate on the rod part 19 as soon as the split ring 49 contacts the race 48. This rotation of the nut 23 will continue until the brake force transmitted is equal to the difference in the forces of the springs 44 and 41. At this moment the nut 22 will be moved rearwardly and the clutch surfaces 27 and 28 will engage. The total length of the adjuster has not been altered substantially during the application of the brake but the axial distance between the nuts 22 and 23 has been increased.

During the following release of the brakes the clutch surfaces 45 and 46 will engage. As soon as the transmitted brake force has been decreased to a value corresponding to the difference in the forces between the springs 44 and 41 the clutch surfaces 27 and 28 will disengage. The nut 22 is now forced to rotate on the rod part 19 which is stationary while the rod part 18 is moved rearwardly. The tube 39 is stationary as its front end contacts the stop 14, but the sleeve 37 is moved rearwardly by the expanding spring 41. Thus the nut 22 is moved rearwardly on the rod part 19 and the total length of the adjuster is reduced correspondingly, thereby causing a desired reduction of the slack in the brake-applying force transmission means.

What I claim is:

1. An automatic axially acting two-way slack adjuster for a brake rigging movable axially in tension upon application of brakes comprising in combination a threaded spindle on a first telescopically acting rod, a first nut thereon having two opposing frictional surfaces on opposite faces, a second telescopically acting member, two mating surfaces on said second member disposed in two spaced axial positions along said spindle to engage the frictional surfaces on opposite faces of said first nut, a barrel about said rod and member, a helical spring disposed in said barrel to bias said second member against one friction surface of said nut, a second nut on said spindle having a clutch surface, mating clutch surface on said barrel disposed for engaging the clutch surface on said second nut, means biasing the clutch surface on said second nut against the clutch surface on said barrel by said helical spring, a further axially movable rod member, a further weaker helical spring weaker than the first said helical spring, means biasing said further rod member by said further helical spring to bear against said first nut, stop means engaging said spring biasing said further rod member after axial movement of the brake system over a predetermined distance, means orienting the further helical spring to oppose the braking forces against said further helical spring so that an increase in the braking force beyond the difference in the forces of the two helical springs will cause one of the clutch surfaces on the barrel to disengage with the mating clutch surface on the second nut and the other clutch surface on the barrel to engage the opposed clutch surface on the second nut.

2. A slack adjuster as defined in claim 1 wherein the means biasing said further rod member includes means for limiting axial movement of the further rod member.

3. A slack adjuster as defined in claim 1 including structure for overcoming the bias of said means biasing the clutch surface on the second nut against the clutch surface of said barrel to permit said second nut to rotate on said spindle when the braking forces are greater than the difference in forces of said two helical springs.

4. An automatic axially acting two-way slack adjuster for a railway vehicle brake rigging, of the kind operable upon transmission of braking forces between two overlapping telescopically displaceable rod parts one of which is of a spindle provided with screw threads having such pitch as to be nonselflocking comprising in combination a nut on said spindle surrounded by the other rod part and having a limited axial play relative thereto, a barrel surrounding the overlapping end portions of the said two rod parts and containing a barrel spring and a clutch surface, means biasing said nut with the force of said spring, a stop member engaged when said braking forces cause an axial movement of predetermined distance between said rod parts, a telescopically compressible push rod device adapted to contact said nut when the adjuster is axially displaced to contact said stop member, a second nut on said spindle having a clutch surface for engaging said clutch surface on said barrel, and means transmitting spring force of the said barrel spring to hold said clutch surface of said second nut against the clutch surface of said barrel until braking forces exceed the force of said barrel spring.